Feb. 16, 1960   R. W. BOEHLOW   2,925,295
SPRING CLIP FASTENER
Filed Feb. 6, 1956

INVENTOR.
ROBERT W. BOEHLOW
BY *Bertram H. Mann*
ATTORNEY

United States Patent Office 2,925,295
Patented Feb. 16, 1960

2,925,295

SPRING CLIP FASTENER

Robert William Boehlow, Pagedale, Mo., assignor, by mesne assignments, to ACF Industries, Incorporated, New York, N.Y., a corporation of New Jersey Application February 6, 1956, Serial No. 563,528

3 Claims. (Cl. 287—93)

This invention relates to a spring clip type of fastener for attaching pivotally connected parts of a mechanical linkage.

Levers of many mechanical devices, and carburetor throttle levers in particular, are operably connected with operating links or rods for manual or automatic control, as the case may be. Usually the lever is apertured to receive a laterally turned rod end, so as to form a pivoted push-pull connection between the rod and lever. Various kinds of fasteners have been proposed to secure the rod end in the lever. Most of these must be removed from both the rod and the lever when it is necessary to disconnect the two, and, because of their small size, the fasteners either become lost or broken during disassembly.

The instant invention is a rod and lever type of fastener which will remain lodged on one of these parts when disassembled. The fastener consists of a spring clip preferably made of spring steel strip folded upon itself and then bent to form two legs extending at 90 degrees to one another. Each leg is suitably apertured to receive the rod proper and its laterally turned rod end in such a way as to embrace opposite sides of the lever through which the rod end is inserted.

Other features of this spring clip will be more specifically described in the following detailed specifications taken with the accompanying drawings, in which.

Figure 1:
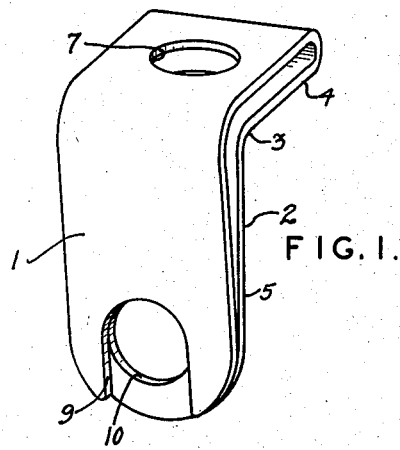
Fig. 1 is a perspective view of one side of the spring clip.
Figure 2:
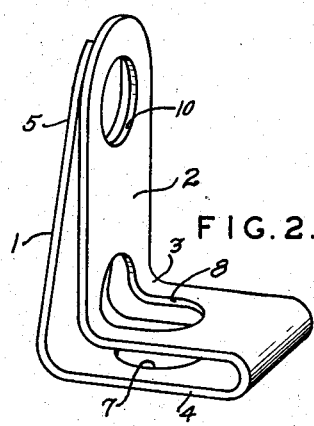
Fig. 2 is a view in perspective of the opposite side of the spring clip.

Referring to Fig. 1 and Fig. 2, a strip of metal is reversely bent upon itself to form an outer side 1 and an inner side 2 of the spring clip. These opposite sides are bent intermediate their length at 3 to form a pair of right-angularly extending legs 4 and 5. The bending operation is carried out in such a way as to bring the outer side 1 into contact with the inner side 2 adjacent the end of the leg 5.

The outer side 1 of the leg 4 has an opening or aperture 7 corresponding in cross section to the rod to be received, while the inner side 2 of the leg 4 has an elongated opening or aperture 8 in alignment with the aperture 7 but extending into the leg 5. The outer side 1 of leg 5 has an opening or slotted open end 9, and the inner side 2 has an opening or aperture 10 in registry with the slot 9.

Figure 3:
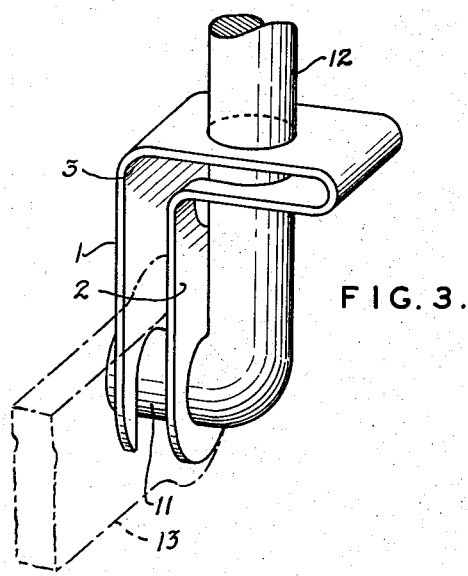
Fig. 3 is a view illustrating the operative position of the spring clip for attaching the lever to the rod.

In use, apertures 7 and 8 in leg 4 are inserted over the rod end 11 into the position shown in Fig. 3, where they grip the main rod portion 12, as will be later explained. In this position, apertures 9 and 10 in leg 5 can be sprung over the turned rod end 11. A suitable tool may be inserted between the inner side 1 and the outer side 2 of the leg 5, and the sides spread so that the outside one is clear of the rod end a sufficient distance to receive the apertured lever end 13. When pressure is relieved, the two sides 1 and 2 come into gripping engagement with the end of the lever 13, securely holding the lever on the turned rod end. When the sides 1 and 2 of leg 5 are spread to receive the lever, openings 9 and 10 firmly grip the rod.

The removal of the rod 12 from the lever 13 is accomplished in the reverse manner by simply inserting a tool between the inner side 1 and the outer side 2 of the leg 5, and spreading the clip to allow the lever 13 to be slipped off the turned rod end. When pressure is released, the clip returns to its former position securely held upon the rod 12 by the tension between the inner side 1 and the outer side 2 of the clip. This prevents the clip from being misplaced or lost, and insures that it will be readily available when the assembly operation is begun.

It is contemplated that certain modifications of a mechanical nature may be made in the clip without departing from the scope of the invention as defined in the following claims.

I claim:

1. A rod joint between an element having angularly related body and journal portions and a member pivotally mounted on said journal portion by a resilient sheet metal clip, said clip having a loop and two legs depending therefrom, portions of said legs adjacent said loop extending transversely of said body portion and having openings therein receiving said body portion, other portions of said legs extending transversely of said journal portion and having openings receiving said journal portion, said other portions of said legs engaging opposite sides of said member to yieldably resist displacement of said member from said journal portion, said legs being resiliently stressed when assembled, and said first-mentioned leg portions engaging diametrically opposed portions of said body portion to prevent rattling.

2. A spring clip of resilient sheet metal for yieldably resisting separation of an element pivotally mounted on a journal portion of a member, comprising two legs interconnected by a loop, said legs having laterally extending end portions extending in the same general direction in abutting engagement, said legs having aligned apertures adjacet said loop and aligned openings in their end portions.

3. A rod joint between an element having angularly related body and journal portions and a member pivotally mounted on said journal portion by a resilient sheet metal clip, said clip having a loop and two legs depending therefrom, portions of said legs adjacent said loop extending transversely of said body portion and having openings therein receiving said body portion, other portions of said legs extending transversely of said journal portion and having openings receiving said journal portion, said other portions of said legs engaging opposite sides of said member to yieldably resist displacement of said member from said journal portion, said legs being resiliently stressed when assembled, and the first and second mentioned portions of said legs gripping said body and journal portions of said element, respectively.

References Cited in the file of this patent

UNITED STATES PATENTS

| | | |
|---|---|---|
| 55,781 | Osborne | June 19, 1866 |
| 852,422 | Danquard | May 7, 1907 |
| 1,879,991 | Pratt | Sept. 27, 1932 |
| 1,966,599 | Roualet | July 17, 1934 |
| 2,313,249 | Lum | Mar. 9, 1943 |